No. 783,908. PATENTED FEB. 28, 1905.
T. E. STOCKFORD.
HAME ATTACHMENT.
APPLICATION FILED APR. 12, 1904.
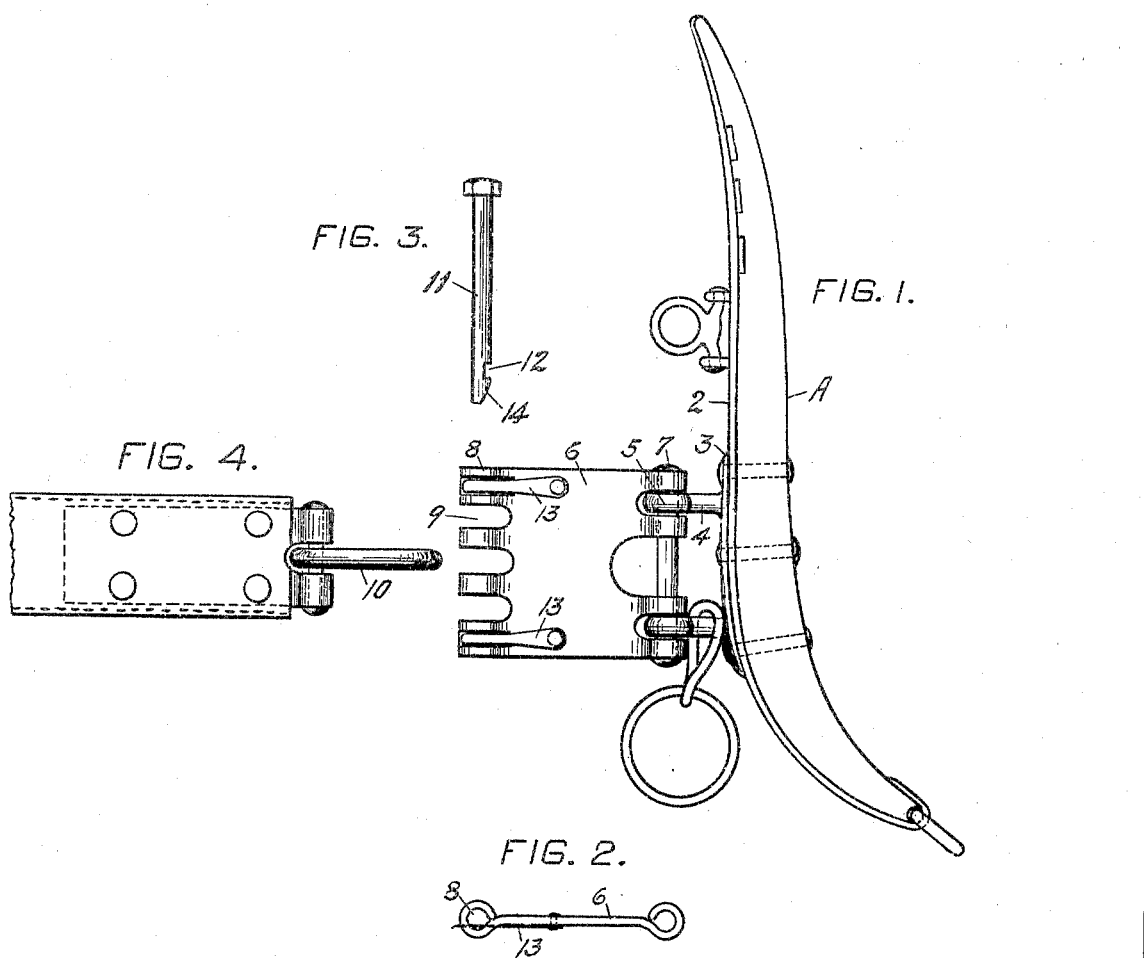

No. 783,908.

Patented February 28, 1905.

UNITED STATES PATENT OFFICE.

THOMAS E. STOCKFORD, OF LEESVILLE, CALIFORNIA.

HAME ATTACHMENT.

SPECIFICATION forming part of Letters Patent No. 783,908, dated February 28, 1905.

Application filed April 12, 1904. Serial No. 202,835.

*To all whom it may concern:*

Be it known that I, THOMAS E. STOCKFORD, a citizen of the United States, residing at Leesville, in the county of Colusa and State of California, have invented new and useful Improvements in Hame Attachments, of which the following is a specification.

My invention relates to a draft attachment for the hames of horse-collars.

It consists of the parts and the constructions and combinations of parts which I will hereinafter describe and claim.

Figure 1 is an elevation of my invention, showing method of attaching plate to hames. Fig. 2 is an edge view of plate. Fig. 3 is a view of pin. Fig. 4 is a view showing end of tug.

For the purpose of adjusting the draft upon the collars of draft-animals plates have been fixed to the hames having slots, so that the draft chains or tugs could be raised or lowered in their attachment to these plates. When such plates are fixed close to the hames, the chain leading backwardly from the plate is constantly rubbing and chafing upon the collar, and this will soon wear the collar through and destroy it.

It is the object of my invention to provide a convenient adjustment and in connection therewith a guard-plate which protects the collar and prevents injury.

A represents the inner portion of an ordinary hame adapted to fit a collar through which the power of the animal wearing the collar is transmitted for draft purposes. Upon the outer surface of the hame is the metal binding-plate 2, extending from top to bottom and riveted, so as to strengthen the hame. My invention is applicable to such hames.

3 is a plate of sufficient length, which is permanently secured upon the plate 2 and the hame by riveting directly through the said plate and hame. This plate 3 may thus be applied to any hames in ordinary use. From the plate 3 standards 4 project outwardly and have in their outer ends the eyes 5, having holes made vertically through them.

6 is a plate the inner edge of which is slotted near the top and bottom and formed with vertical eyes or openings, so that the slots are adapted to fit over the eyes 5 of the standards 4, and pins or rivets passing through these parts, as shown at 7, serve to unite them together and allow the plate to swivel freely about the standards 4. The outer edge of the plate 6 is turned over or formed with eyes, as at 8, and between these the plate is cut away to form grooves or channels, as at 9, and these grooves or channels are of such shape and size as to admit of a link of the draft-chain or a corresponding link attached to an ordinary leather tug, as shown at 10. It will be seen that the vertical depth of the plate 6 may be as great as desired and the number of the slots 9 such that any required adjustment of draft may be made by inserting the draft link or chain into different slots 9, either higher or lower, as required. In order to readily secure these links in place, I have shown a pin, as 11, having a transverse notch made across it, as at 12, and when this chain has been inserted through the holes 8 and the draft-chain link the pin is secured automatically by means of a spring 13, which is riveted or otherwise secured to the plate 6. The lower end or point of the pin is preferably beveled, as shown at 14, so that when pushed down through the openings 8 it will force the spring outwardly and allow the pin to pass the spring until the latter falls into the notch or slot 12, thus securing it in place. By lifting the point of the spring 13 it will be disengaged and the pin 11 can be readily withdrawn and the draft-chain released or transferred to some other opening.

An important point in my construction lies in the employment of the broad guard-plate 6, hinged to the standards 4, which hold it out to a considerable distance from the hames, so that when the hames are fitted about that portion of the collar which is formed for that purpose the plate will be carried out beyond the swell or belly of the larger portion of the collar and will rest against this larger portion of the collar, forming a comparatively flat contact-surface which will not chafe or wear, and the draft-chains are attached to the outer edge of this plate, thus being carried entirely away from and clear of the collar, so that the latter will suffer no wear from these chains.

The plates 6 are so made that they can be reversed and fitted upon the hames over either side of the collar, and I preferably attach two of the springs 13, one near each edge, so that the pin 11 may be put through from the top whichever edge of the plate may be upward, and the springs are so located that either one of them will lock the pin in place.

Having thus described my invention, what I claim, and desire to secure by Letters Patent, is—

1. The combination with a hame member, of a plate fixed upon the outer edge thereof and having standards extending from the outer face, a broad guard-plate to extend across the belly of the collar said standards and the adjacent edge of the guard-plate having eyes and said edge of the guard-plate provided with slots to receive said standards, a pin passing through said eyes and hingedly connecting the standards and guard-plate, said guard-plate interchangeable from one hame member to another and having its opposite edge provided with a vertical series of eyes and intermediate channels for the adjustable connection of draft attachments, a pin passing through said last-named eyes, and means at the upper and lower portions of the guard-plate for locking said pin in place in whatever position the guard-plate is placed.

2. A guard-plate extending across the belly of a horse-collar and interchangeable from one hame member to another said plate having its front edge hinged to one of said members and having a vertical series of slots in the opposite edge, a pin passing through the said series of slots to adjustably receive draft attachments, said pin having a transverse slot, and springs at opposite sides of the center of the plate in the path of the pin whereby said pin may be inserted from the top and locked whichever edge of the plate may be upward.

In testimony whereof I have hereunto set my hand in presence of two subscribing witnesses.

THOMAS E. STOCKFORD.

Witnesses:
   HENRY P. TRICOU,
   S. H. NOURSE.